US012006827B2

(12) United States Patent
Governatori

(10) Patent No.: US 12,006,827 B2
(45) Date of Patent: Jun. 11, 2024

(54) MOVEMENT DEVICE

(71) Applicant: LONATI S.P.A., Brescia (IT)

(72) Inventor: Giordano Governatori, Magliano in Toscana (IT)

(73) Assignee: Lonati S.P.A., Brescia (IT)

( * ) Notice: Subject to any disclaimer, the term of this patent is extended or adjusted under 35 U.S.C. 154(b) by 0 days.

(21) Appl. No.: 18/548,624

(22) PCT Filed: Jan. 26, 2022

(86) PCT No.: PCT/EP2022/051767
§ 371 (c)(1),
(2) Date: Sep. 1, 2023

(87) PCT Pub. No.: WO2022/184347
PCT Pub. Date: Sep. 9, 2022

(65) Prior Publication Data

US 2024/0151145 A1 May 9, 2024

(30) Foreign Application Priority Data

Mar. 2, 2021 (IT) ........................ 102021000004790

(51) Int. Cl.
*F01C 19/02* (2006.01)
*F01C 1/22* (2006.01)
(Continued)

(52) U.S. Cl.
CPC ................ *F01C 1/22* (2013.01); *F01C 19/02* (2013.01); *F01C 21/08* (2013.01); *F02B 53/02* (2013.01); *G04B 1/26* (2013.01); *G04B 3/12* (2013.01)

(58) Field of Classification Search
CPC .. F01C 1/22; F01C 19/02; F01C 21/08; F02B 53/02; G04B 1/26; G04B 3/12
See application file for complete search history.

(56) References Cited

U.S. PATENT DOCUMENTS 3,082,596 A * 3/1963 McGay .................... G04B 3/12 968/39
3,286,454 A * 11/1966 Wustenhagen ......... F01B 17/00 368/65
(Continued)

FOREIGN PATENT DOCUMENTS

CN 108825366 A 11/2018
EP 1942265 A1 7/2008
(Continued)

OTHER PUBLICATIONS

International Search Report and Written Opinion mailed May 6, 2022 in PCT/EP2022/051767 (11 pgs.).
Search report dated Oct. 17, 2021 in IT102021000004790 (8 pgs.).

*Primary Examiner* — J. Todd Newton
(74) *Attorney, Agent, or Firm* — Quicker Law, LLC

(57) ABSTRACT

A movement device (1) comprising a stator chamber (2) inside which a rotor (3) can rotate about a respective axis (100), wherein the stator chamber (2) has an elongated shape that is extended along a longitudinal direction (101) and is connected, by means of a first intake or supply duct (4) and a second transfer or discharge duct (5), to a tank (6) for containing pressurized oxyhydrogen, the containment tank (6) having a first tank portion (6*a*) connected to the intake or supply duct (4) and a second tank portion (6*b*) connected to the transfer or discharge duct (5), a compensation valve (8) being interposed between the first tank portion (6*a*) and the second tank portion (6*b*), the rotor (3) comprising a three-lobed structure which forms three side walls (31, 32, 33) which cooperate with the stator chamber (2) in order to form, during its rotation about the axis (100), an intake chamber (41) at the outlet (4*a*) of the first intake or supply duct (4), a discharge chamber (42) at the outlet (5*a*) of the second transfer or discharge duct (5), and a compression
(Continued)

chamber (43), the rotor having a blade-like portion (60) which forms a counterweight.

7 Claims, 3 Drawing Sheets

(51) Int. Cl.

| | |
|---|---|
| ***F01C 21/08*** | (2006.01) |
| ***F02B 53/02*** | (2006.01) |
| ***G04B 1/26*** | (2006.01) |
| ***G04B 3/12*** | (2006.01) |

(56) References Cited

U.S. PATENT DOCUMENTS

| | | | | |
|---|---|---|---|---|
| 3,876,344 | A | 4/1975 | Nestor | |
| 3,909,013 | A * | 9/1975 | Kumar | F16J 15/164 277/357 |
| 6,006,519 | A * | 12/1999 | Hormell, Jr. | F01B 17/00 60/407 |
| 8,978,618 | B2 * | 3/2015 | Davis | F01C 19/02 60/519 |
| 2019/0235442 | A1 * | 8/2019 | Vouillamoz | G04B 1/265 |

FOREIGN PATENT DOCUMENTS

| | | | | |
|---|---|---|---|---|
| EP | 2706417 | A1 | 3/2014 | |
| TW | 200407684 | A * | 5/2004 | G04B 1/00 |

* cited by examiner

MOVEMENT DEVICE

CROSS-REFERENCE TO RELATED APPLICATION

This application is the National Stage of International Application No. PCT/EP2022/051767 filed Jan. 26, 2022, which claims priority to and the benefit of Italian Application No. 102021000004790 filed Mar. 2, 2021, the disclosures of which are incorporated herein by this reference in their entireties.

The present invention relates to a movement device.

In particular, the movement device is adapted to move the balance of a timepiece.

Movement devices of various types are known and some of them are used also in timepieces, both wall clocks and wristwatches.

Typically, timepieces, especially wristwatches, are divided in mechanical and quartz timepieces.

Both categories of timepieces, the mechanical ones and the quartz ones, are intended to indicate time. The substantial differences relate to their interior.

First of all, every timepiece relies on the energy stored in it. In mechanical timepieces, this energy is usually generated by a loading spring contained in a barrel. The power reserve, i.e., the run time of a mechanical timepiece, varies according to the length of this spring, but usually reaches a duration of a few tens of hours.

The typical mechanism of a mechanical timepiece provides that a gear transmits stored energy to an oscillating mass. This determines the rhythm of each timepiece; it is its beating heart. The oscillating mass of mechanical timepieces is usually composed of a balance, an escapement wheel and an anchor. The interaction among these components is what causes ticking: a high frequency of the balance produces faster ticking, and vice versa. The movement of the seconds hand also becomes smoother as the frequency of the balance increases. This frequency usually corresponds to 28,800 alternations per hour (A/h), or 4 Hz.

Quartz timepieces work in a completely different way. Their power is usually derived from a battery which can provide the energy needed to run the timepiece for several years. As soon as its energy is exhausted, the battery must be replaced.

The impulse is generated by a quartz crystal, which starts to oscillate as soon as an electrical voltage is applied. This is the so-called inverse piezoelectric effect. The shape of the quartz crystal is similar to that of a tuning fork. The frequency normally corresponds to 32,768 Hz and is therefore much higher than that of a mechanical timepiece: this is why quartz timepieces are much more accurate.

A circuit divides the frequency into two units to generate the timing of the seconds. This is why the seconds hand jumps forward every second. If the timepiece is not provided with hands, time indication occurs by means of an LCD screen.

Pneumatic motors are known which have different shapes and variable dimensions, from portable turbines to motors with a power output of up to several hundred horsepower, and they find widespread use in portable equipment, although there are continuing attempts to expand their use.

Compressed air exits from tanks at high pressure, about 300 bar, and the expansion of the air is used to move a piston or a gas turbine connected to a driving shaft.

Since it has no combustion of any kind, the compressed air motor is free from any polluting emission. Compressed air is used as an energy vector: any pollution, in case of production with traditional techniques, is in the production step which is used to generate the energy vector used to actuate the compressor when the cylinder must be filled.

However, these motors are extremely bulky and scarcely efficient from an energy point of view.

The aim of the present invention is to provide a movement device that is capable of improving the background art in one or more of the aspects mentioned above.

Within this aim, an object of the invention is to provide a movement device adapted to be used in timepieces, even wristwatches, but also adapted to move different elements or apparatuses, such as for example shafts or balances.

Not least object of the invention is to provide a movement device that is highly reliable, relatively easy to provide and with compact dimensions.

This aim and these and other objects which will become better apparent hereinafter are achieved by a movement device according to claim 1, optionally provided with one or more of the characteristics of the dependent claims.

Further characteristics and advantages of the present invention will become better apparent from the description of some preferred but not exclusive embodiments of the movement device according to the invention, illustrated by way of non-limiting example in the accompanying drawings, wherein.

Figure 1:
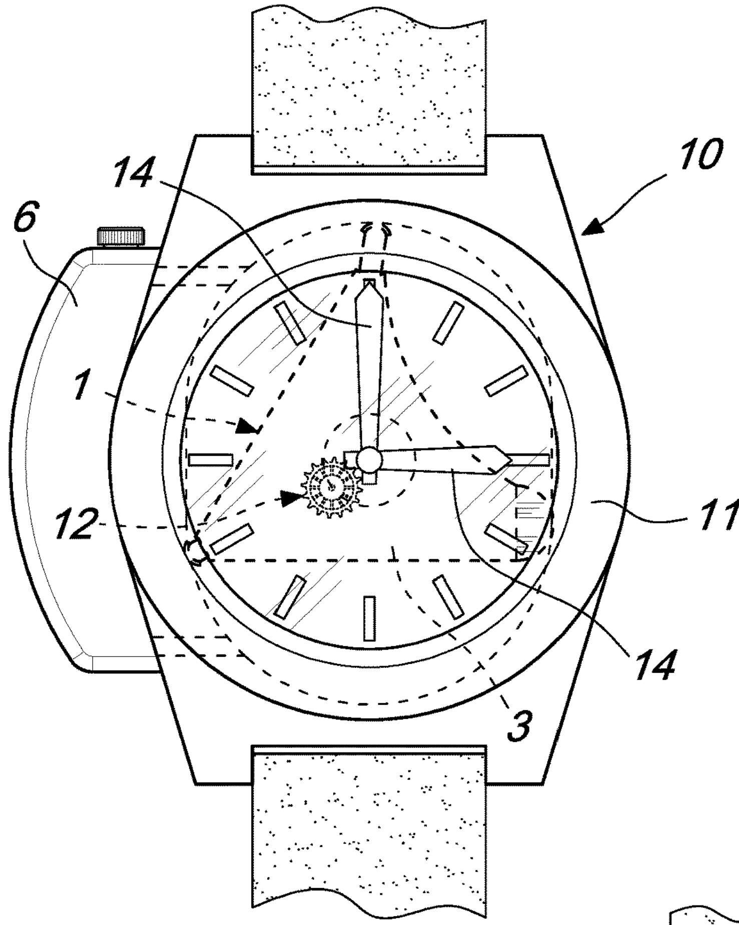
FIG. 1 is an elevation view of a timepiece associated with a movement device according to the invention.
Figure 2:
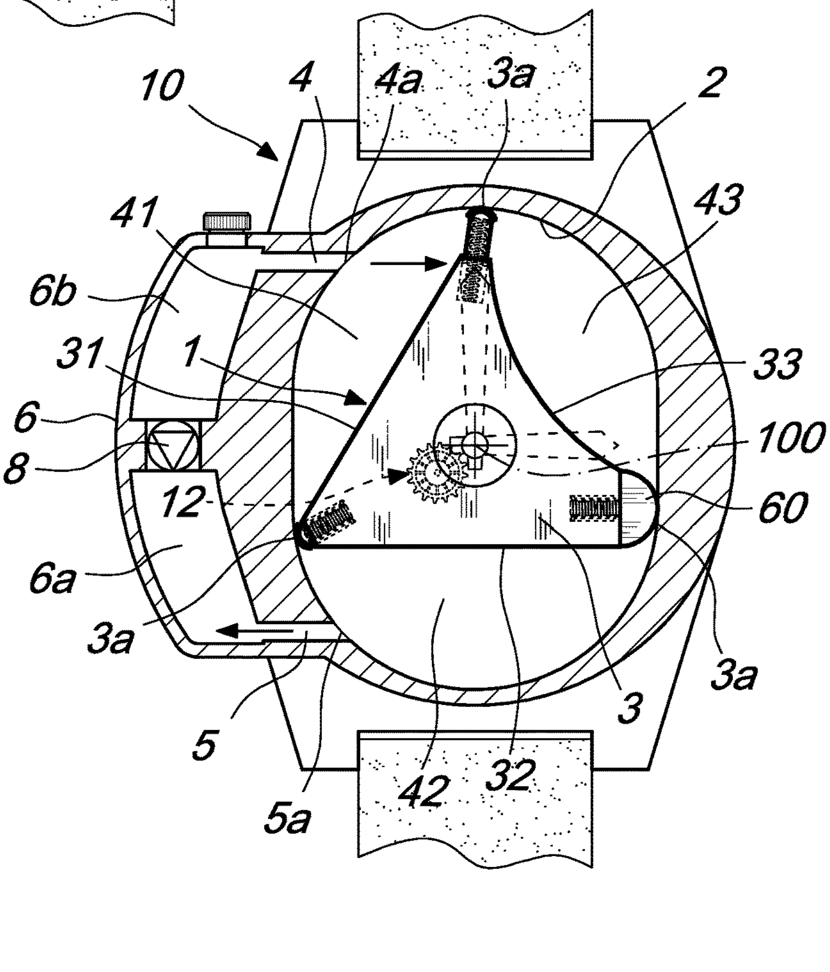
FIG. 2 is a sectional view of the timepiece of FIG. 1 with the rotor of the movement device in a first angular position.
Figure 3:
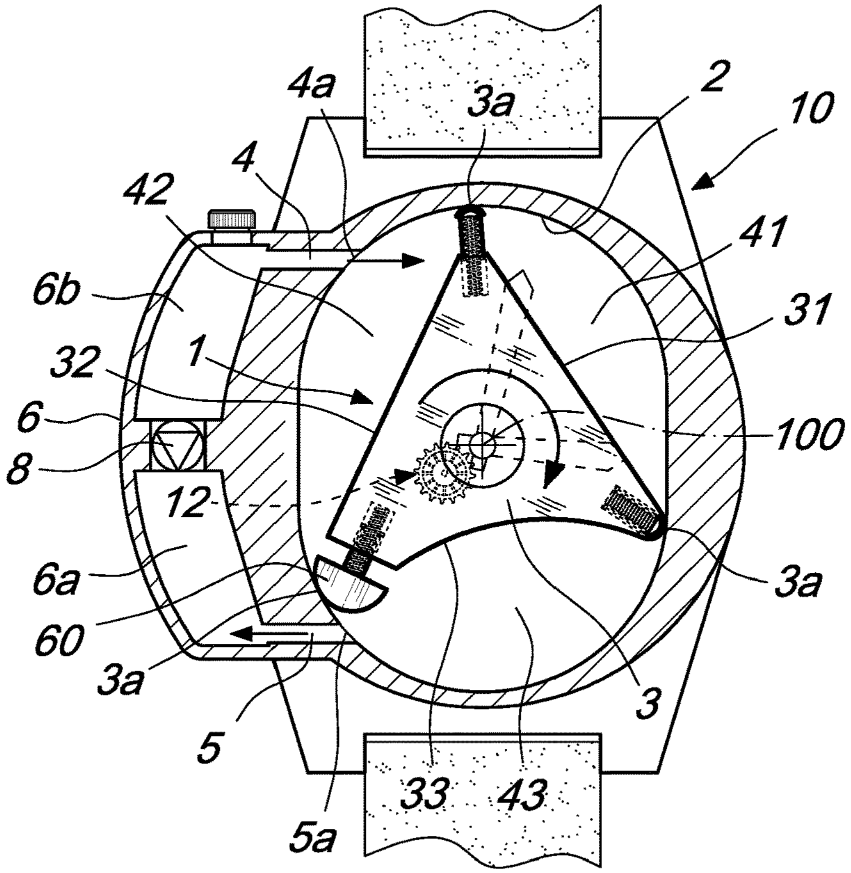
FIG. 3 is a sectional view of the timepiece of FIG. 1 with the rotor of the movement device in a second angular position.
Figure 4:
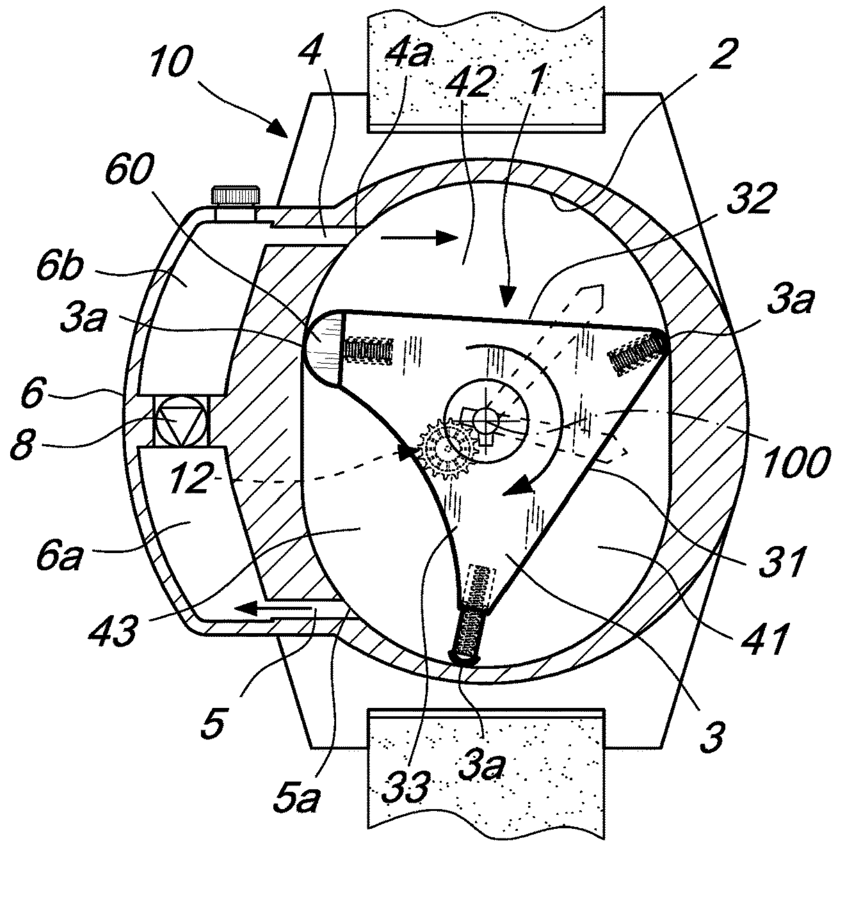
FIG. 4 is a sectional view of the timepiece of FIG. 1 with the rotor of the movement device in a third angular position.

With reference to the figures, the movement device according to the invention, generally designated by the reference numeral 1, comprises a stator chamber 2 inside which a rotor 3 can rotate about a respective axis 100.

The stator chamber 2 has an elongated shape.

In particular, the stator chamber 2 extends along a longitudinal direction designated in the figures by the reference numeral 101.

The stator chamber 2 is connected, by means of a first intake or supply duct 4 and a second transfer or discharge duct 5, to a tank 6 for containing pressurized oxyhydrogen.

The containment tank 6 has a first tank portion **6*a* connected to the intake or supply duct 4 and a second tank portion 6*b* connected to the transfer or discharge duct 5**.

A compensation valve 8 is interposed between the first tank portion **6*a* and the second tank portion 6*b***.

The rotor 3 comprises a three-lobed structure which forms three side walls 31, 32, 33 which cooperate with the stator chamber 2 in order to form, during its rotation about the axis 100, an intake chamber 41 at the outlet **4*a* of the first intake or supply duct 4, a discharge chamber 42 at the outlet 5*a* of the second transfer or discharge duct 5, and a compression chamber 43**.

In particular, the rotor 3 has a blade-like portion 60 which forms a counterweight.

Preferably, the containment tank 6 has an oxyhydrogen refilling port.

Conveniently, the rotor 3 comprises bronze or Teflon contact shims **3*a***.

In fact, since no combustion occurs inside the stator, there is no risk due to overheating of the contact shims **3*a***.

According to a first embodiment shown in FIGS. 1 to 4, the axis 100 of the rotor is fixed.

In this case, the contact shims 3*a* can move in a radial direction with respect to the rotor axis 100.

In particular, there are means for keeping the contact shims 3*a* against the internal surface of the stator chamber 2 during the rotation of the rotor 3 about the axis 100.

With reference to the figures, the means for keeping the contact shims 3*a* against the internal surface of the stator chamber 2 may comprise respective pusher elements, for example comprising springs, which act between the body of the rotor and the respective contact shims 3*a*.

Obviously, the means for keeping the contact shims 3*a* against the internal surface of the stator chamber 2 are adapted to ensure the tightness of the three lateral walls 31, 32, 33 which cooperate with the stator chamber 2.

Figure 5:
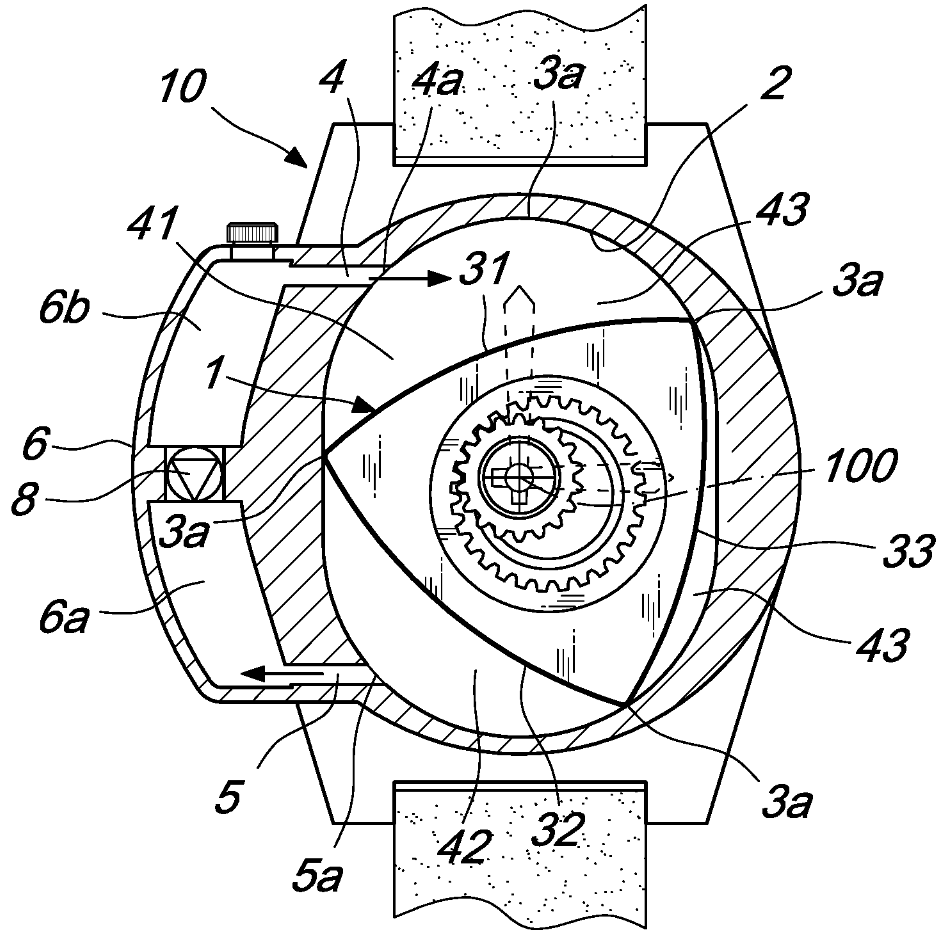
FIG. 5 is a view of another embodiment of the movement device according to the invention.

According to another embodiment shown schematically in FIG. 5, the axis 100 of the rotor is movable about an axis 102 of the stator chamber 2 during the rotation of said rotor 3.

In this case, there is a first gear 51 which is integral with the rotor 3 and meshes with a second fixed gear 52 which is integral with the stator chamber 2 and is arranged around the axis 102 of the stator chamber 2.

In this embodiment, the stator chamber 2 and the rotor 3 have a shape that is similar to the shape of a stator chamber and of the respective rotor of a Wankel engine, and the relative movements are substantially similar.

However, there is no combustion as in the classic Wankel engines but rotation is determined by the expansion of the oxyhydrogen in the intake chamber 41, while the discharge is ensured by the inertia of the blade-like portion provided with the counterweight 60.

According to a preferred embodiment shown in the figures, the movement device 1 comprises a timepiece 10.

As shown in the figures, the timepiece 10 has a case 11 which accommodates the stator chamber 2.

The rotor 3 is in turn connected kinematically, by means of a gear train 12, to the hands 14 of the timepiece 10.

Advantageously, the oxyhydrogen has, inside the containment tank 6, a pressure comprised between 2 bars and 100 bars.

The pressure can vary according to the characteristics of use, such as the rotation rate and the run time.

The operation of the movement device 1, according to the invention, is as follows.

The pressurized oxyhydrogen is loaded into the containment tank 6.

The passage ports of the first intake or supply duct 4 and of the second transfer or discharge duct 5, as well as the compensation valve 8, are sized in order to ensure the rotation of the rotor 3 inside the stator chamber 2 at a certain angular velocity and for a preset time which depends on the operating pressure, on the quantity of oxyhydrogen contained in the containment tank, and on the overall frictions.

In practice it has been found that the invention achieves the intended aim and objects, providing a movement device that is extremely reliable and effective.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The invention claimed is:

1. A movement device comprising a stator chamber inside which a rotor is configured to rotate about a respective axis, wherein said stator chamber has an elongated shape that is extended along a longitudinal direction and is connected, by means of a first intake or supply duct and a second transfer or discharge duct, to a tank for containing pressurized oxyhydrogen, said tank having a first tank portion connected to said intake or supply duct and a second tank portion connected to said transfer or discharge duct, a compensation valve being interposed between said first tank portion and said second tank portion, said rotor comprising a three-lobed structure which forms three side walls which cooperate with said stator chamber in order to form, during a rotation thereof about said axis, an intake chamber at an outlet of said first intake or supply duct, a discharge chamber at an outlet of said second transfer or discharge duct, and a compression chamber, said rotor having a blade-like portion which forms a counterweight.

2. The movement device according to claim 1, wherein said containment tank has an oxyhydrogen refilling port.

3. The movement device according to claim 1, wherein said rotor comprises bronze or Teflon contact shims.

4. The movement device according to claim 3, wherein said axis about which the rotor rotates is fixed and said bronze or Teflon contact shims are configured to move in a radial direction with respect to said rotor axis, means being provided for keeping said bronze or Teflon contact shims against an internal surface of said stator chamber during a rotation of said rotor about said axis.

5. The movement device according to claim 1, wherein said axis about which the rotor rotates is movable about an axis of the stator chamber during the rotation of the rotor, a first gear being provided which is integral with said rotor and meshes with a second fixed gear which is integral with said stator chamber and is arranged around said axis of the stator chamber.

6. The movement device according to claim 1, wherein said stator chamber and said rotor have a shape that is similar to a shape of a stator chamber and of a respective rotor of a Wankel engine.

7. The movement device according to claim 1, further comprising a timepiece which has a case which accommodates said stator chamber, said rotor being connected kinematically, by means of a gear train, to hands of said timepiece.

* * * * *